United States Patent Office 3,040,041
Patented June 19, 1962

3,040,041
CHEMICAL COMPOUNDS AND PROCESS FOR PRODUCING THE SAME
Carl-Wolfgang Schellhammer, Leverkusen-Bayerwerk, and Gerhard Domagk, Wuppertal-Elberfeld, Germany, assignors to Farbenfabriken Bayer Aktiengesellschaft, Leverkusen, Germany, a corporation of Germany
No Drawing. Filed Mar. 7, 1960, Ser. No. 12,895
Claims priority, application Germany Mar. 7, 1959
4 Claims. (Cl. 260—243)

This invention relates to new organic chemical compounds and to a process for producing the same. In particular, the invention involves the provision of novel polynuclear quinone derivatives which have been found to be highly effective tuberculostatic agents. The invention further encompasses a unique synthesis utilized in the production of these compounds.

In general, our invention is predicated on the discovery that the reaction of quinone derivatives of the general structure—

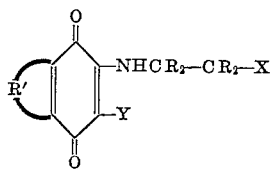

(wherein the R substituents represent hydrogen atoms or alkyl, aryl or heterocyclic radicals which may be connected to form a ring sytem; X and Y represent chlorine or bromine atoms; and R' represents a carbocyclic or heterocyclic ring structure of five or six carbon atoms which, in turn, may carry substituent groups) with salts of hydrogen sulfide yields polynuclear quinone derivatives having the general structure—

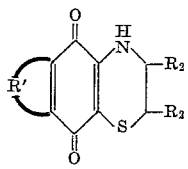

wherein R and R' have the same meaning as assigned above.

Typical starting materials for use in the production of the compounds of the invention include, among others, the suitably substituted derivatives of 1,4-naphthoquinone, 5,6,7,8-tetrahydro-1,4-naphthoquinone and 5,8-quinoline-quinone. The latter derivatives are prepared by heating a 6,7-dihalo-5,8-quinoline-quinone with a substance selected from the group consisting of ammonia, primary aliphatic amines containing up to 4 carbon atoms, morpholine and thiomorpholine, and recovering from the reaction mixture a 7-halo-5,8-quinoline-quinone having in the 6-position one of the radicals of the above mentioned amines. The corresponding derivatives of 1,4-naphthoquinone or 5,6,7,8-tetrahydro-1,4-naphthoquinone may be obtained in an analogous manner.

In order to achieve ring-closure between the substituent members on the original quinone ring it is merely necessary to treat the starting material with solutions of equivalent amounts of the salts of hydrogen sulfide in water, in mixtures of water with organic solvents such as low-molecular weight alcohols, dimethyl formamide or dimethyl sulfoxide, or in these solvents alone at temperatures between 0° C. and the boiling point of the particular solvent or solvent mixture involved. The products separate out readily in crystalline form upon cooling the reaction mixture, or may be separated by concentrating the solutions. In general, the compounds are red to violet crystalline materials which are soluble in organic solvents, and quite often readily soluble in water.

In their application as tuberculostatic agents, the compounds of the invention are capable of inhibiting the growth of the tubercle bacillus strain H 37 Rv, as well as strains normally resistant to isonicotinic acid hydrazide, p-aminosalicylic acid or thiosemicarbazones, in dilutions of 1:1 million. They can be employed in these applications either alone or in combination with conventional pharmaceutical agents, carriers, diluents, etc.

We have further found that it is possible to reduce the novel compounds of the invention to the corresponding hydroquinones, and to acetylate the hydroxyl groups without loss of their valuable chemotherapeutic properties. Furthermore, by oxidation of the compounds with nitric acid, for example, it is possible to transform the cyclic sulfur atom into the corresponding sulfoxide or sulfone.

It is believed that the invention may be best understood by reference to the following specific examples illustrating the application of the foregoing principles and procedures to the preparation of typical compounds of the invention.

EXAMPLE I

*Preparation of the Compound 2,3-Dihydro-(Lin. Naphthothiazine)-5,10-Quinone as Represented by the Formula:*

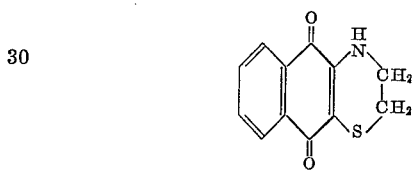

2 - (β - chloroethylamino) - 3 - chloro - 1,4 - naphthoquinone, in amount 27 grams, was dissolved in 200 milliliters of alcohol and treated with a solution of 24 grams of crystalline sodium sulfide in 50 milliliters of water. The mixture was stirred for 20 minutes and was then heated to boiling for 40 minutes. The reaction mixture was then permitted to stand over night, and was thereafter filtered by suction. The resulting precipitate was washed with methanol and recrystallized from chlorobenzene. There were obtained 16 grams of the desired product in the form of dark red crystals of melting point 220° C. (decomp.).

EXAMPLE II

*Preparation of the Compound 2,3,6,7,8,9-Hexahydro-(Lin. Naphthothiazine)-5,10-Quinone, as Represented by the Formula:*

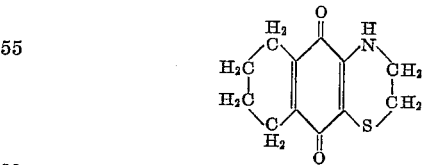

2 - (β - chloroethylamino) - 3 - chloro - 5,6,7,8, - tetrahydro-1,4-naphthoquinone (M.P. 117° C.), in amount 28 grams, was dissolved in 150 milliliters of alcohol and treated with a solution of 24 grams of crystalline sodium sulfate in 50 milliliters of water. After one hour, the mixture was briefly heated to boiling and was then allowed to stand over night. Following filtration by suction, the product was washed with water and with methanol, and was then recrystallized from chlorobenzene. Nine (9) grams of the desired product were obtained in the form of dark violet crystals of melting point 191–195° C. (decomp.).

EXAMPLE III

*Preparation of the Compound 2,3-Dihydro-8-Methyl-9-Aza-(Lin. Naphthothiazine)-5,10-Quinone, as Represented by the Formula:*

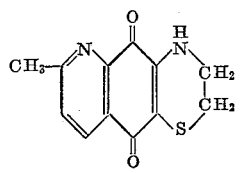

In analogous manner to that described in Example II, 28.5 grams of 6-(β-chloroethylamino)-7-chloro-5,8-quinoline-quinone (M.P. 192° C.) was treated to produce 7 grams of the foregoing compound in the form of blue-violet crystals of melting point 202–205° C., following recrystallization from aqueous alcohol.

Having thus described the subject matter of our invention, what it is desired to secure by Letters Patent is:

1. The chemical compound 2,3-dihydro-(lin. naphthothiazine)-5,10-quinone.
2. The chemical compound 2,3,6,7,8,9-hexahydro-(lin. naphthothiazine)-5,10-quinone.
3. The chemical compound 2,3-dihydro-8-methyl-9-aza-(lin. naphthothiazine)-5,10-quinone.
4. A chemical compound selected from the group consisting of 2,3-dihydro-(lin. naphthothiazine)-5,10-quinone; 2,3,6,7,8,9 - hexahydro - (lin. naphthothiazine) - 5,10-quinone; and 2,3-dihydro-8-methyl-9-aza-(lin. naphthothiazine)-5,10-quinone.

No references cited.